United States Patent Office 3,711,462
Patented Jan. 16, 1973

3,711,462
METHOD OF CLARIFYING POLYSACCHARIDE SOLUTIONS
Milton K. Abdo, Dallas, Tex., assignor to Mobile Oil Corporation
No Drawing. Filed Apr. 1, 1970, Ser. No. 24,887
Int. Cl. C07c 47/18
U.S. Cl. 260—209          10 Claims

ABSTRACT OF THE DISCLOSURE

The specification discloses a method for removing bacterial debris from an aqueous solution of a microbially-produced polysaccharide. A montmorillonite clay is dispersed in the solution to absorb the debris. A monovalent and/or divalent salt is added if not already present in the solution. Next, a clay coagulant is added to the solution to flocculate the clay and adsorbed debris which in turn is then removed from the clarified solution by mechanical means.

BACKGROUND OF THE INVENTION

The present invention relates to a method of clarifying microbially-produced polysaccharides and more particularly relates to removing bacterial debris from said polysaccharides.

During the past few years, microbially-produced polysaccharides have been proposed for a variety of industrial uses, e.g., thickeners or body agents for edible compositions, cosmetic formulations, pharmaceutical vehicles, drilling muds, water for flooding oil producing formations, and many others. These include the heteropolysaccharides formed by the fermentation of carbohydrates with organisms of the genus Xanthomonas. One of the best known of these heteropolysaccharides is that prepared by employing bacterial Xanthomonas campestris and is commonly referred to as polysaccharide B-1459.

Most microbially-produced polpsaccharides such as B-1459 as they are normally produced commercially are soft, bulky, slightly colored powders which may be dissolved in water at room temperature or a higher temperature to produce a viscous fluid which shows a tendency to gelation. It has been found that when most commercially available polysaccharides, e.g., B-1459, are hydrated, a substantial amount of bacterial debris is present in the resulting solutions. This finely divided debris forms a stable suspension which is virtually unaffected by gravity and accordingly will not settle nor can it be centrifuged out of the polysaccharide solution by standard techniques. Depending on the proposed use of the polysaccharide solution, this debris may or may not produce undesired effects when used.

One instance where undesired effects can be attributed to the bacterial debris occurs where the microbially-produced polysaccharide is used to thicken water which is used to flood oil producing, earth formations. It is believed that this debris causes turbidity and reduces the desired viscosity enhancing potential of the polysaccharide. Further, it is believed that this debris contributes a plugging property to the floodwater which may prevent the use of these polysaccharides as thickeners in floodwaters where the formations to be flooded are tight or have low permeability. Another instance where this debris may affect the use of microbially-produced polysaccharides is in food and drug applications where purity is critical.

Present methods of removing this bacterial debris from microbially-produced polysaccharide solutions include filtration through fine pores or filter beds but, in addition to being time consuming and expensive, this technique also results in substantial loss of the polysaccharide itself. These factors make this technique unattractive in many instances.

SUMMARY OF THE INVENTION

In accordance with the present invention, there is provided a method for removing bacterial debris from an aqueous solution of a microbially-produced polysaccharide. The method includes dispensing a montmorillonite clay, e.g., bentonite, into the solution so that the debris will absorb onto the clay. If there are no monovalent or divalent salts already present in solution, such salt is added. This salt, e.g., sodium and/or calcium salt, aids in flocculating the clay when the next step of adding a clay coagulant, e.g., polyacrylamide, is carried out. The fluocculated clay along with the adsorbed debris normally begins to settle in minutes but the settling process can be speeded up significantly by slightly heating the solution. The flocculated material is then easily separated by mechanical means, e.g., mineral centrifuging, to leave the desired clarified solution.

The actual operation and apparent advantages of the present invention will be better understood by referring to the following detailed description.

DESCRIPTION OF THE PREFERRED EMBODIMENT

Microbially-produced polysaccharides are substances produced by fermentation processes involving the controlled use of certain bacteria. One such group of microbially-produced polysaccharides is the heteropolysaccharides which are substances formed by the fermentation of carbohydrates with organisms of the genus Xanthomonas. Typical of this group and one of the best known is that commonly referred to as polysaccharide B-1459 which contains d-glucose, d-mannose, and d-glucuronic acid groups in the ratio of 2.8:3.0:2.0. It also contains 3% to about 3.5% by weight of pyruvic acid and about 4.7% by weight of acetic acid. The acetic acid exists as the O-acetyl ester, whereas the pyruvic acid is attached through a ketal linkage. The polysaccharide B-1459 is produced by culturing bacterium Xanthomonas campestris NRRL B-1459, U.S. Department of Agriculture, on a well-aerated medium having a pH of about 7 containing commercial glucose, organic nitrogen sources, dipotassium hydrogen phosphate, and appropriate trace elements. The preferred fermentation temperature during the culturing is about 28° C. The fermentation reaction is complete in about 96 hours or less. Most bacterial cell and suspended impurities are removed from the fermentation product by centrifugation after adjusting the pH to from 5 to 6. The polysaccharide B-1459 is precipitated from the centrifuged fermentation product by adding salt and a low molecular weight alcohol thereto.

The resulting B-1459 normally exists as a soft, bulky, slightly colored powder and has an estimated molecular weight to be in the millions, judging from the fact that a 1% by weight aqueous solution of the polymer has a viscosity of 3000 centipoises when measured at 25° C. on a Brookfield LVT viscometer at 30 revolutions per minute. B-1459 is now a relatively standard product and is commercially available.

Microbially-produced polysaccharides, including B-1459, have been proposed for a variety of industrial uses. One of primary interest to the petroleum industry has been the use of these polysaccharides to thicken water for use in flooding petroleum-bearing formations to increase production therefrom. The powdered polysaccharide, such as B-1459, is hydrated to form an aqueous solution typically containing from 0.05% to 2.0% by weight polymer. However, it has been found that such a solution also normally contains a substantial amount of bacterial debris, e.g., up to 16% by weight of the original polysaccharide being debris. While this debris may not affect some applications of the aqueous solution, it is considered undesirable in others.

For example, when the aqueous solution of the polysaccharide is used to flood formations of low permeability, the debris contributes a plugging property to the solution which can severely restrict its use. Further, it is believed that the debris causes turbidity in the solution and reduces the desired viscosity enhancing potential of the polysaccharide. The debris forms a highly stable suspension in the aqueous solution which is virtually unaffected by gravity so the debris does not settle nor can it be separated by normal centrifuging. Most of the debris can be removed by filtering the solution through fine pores or sophisticated filter beds but this has been found to result in substantial loss of the polysaccharide itself.

The present invention provides a method for clarifying an aqueous solution of microbially-produced polysaccharide which allows the bacterial debris to be removed from the aqueous solution without any noticeable loss of the polymer. The method involves first dispensing a montmorillonite clay, preferably bentonite, in the aqueous solution. The debris will adsorb onto clay from the solution. As far as it can be determined, no polymer is adsorbed along the debris.

Next, a monovalent and/or divalent salt is added to the solution, if such salt is not already present. In many instances, the water used in preparing the aqueous solution will be a brine or the like which already contains monovalent and/or divalent salts in adequate proportions to make the adding of additional salt unnecessary. If salt is added, the order in which the clay and the salt is added to the solution is not critical and either may be added first.

The salt is to aid in flocculating the clay which is accomplished by next adding a clay coagulant, e.g., polyacrylamide, to the solution. The clay begins to flocculate almost immediately and it along with the adsorbed, bacterial debris starts to settle in a matter of minutes. This settling process can be significantly speeded up by slightly heating the solution. The flocculated material can then be easily and quickly separated from the solution by any of a variety of mechanical means, e.g., decantation, minimal centrifuging, or coarse filtration. To fully illustrate the present invention, a more specific example is set out below.

A 0.3% aqueous solution of a microbially-produced polysaccharide, i.e., B–1459, was prepared from essentially salt-free water. Montmorillonite clay was added to the solution and dispersed therein in the amount of from 0.15% to 0.3% by weight. The clay was bentonite of the type marked under the name Aquagel. The upper limit of this range, i.e., 0.3% by weight, is sufficient for solutions up to 2% by weight of polymer which is maximum amount of polymer normally used. Since, in this example, there was no salt present in the solution, monovalent and divalent salts were added. A minimum of 0.15% by weight of sodium chloride or 50 parts per million (p.p.m.) calcium ion can be used or a combination of as little as 500 p.p.m. and 20 p.p.m. of sodium and calcium ions, respectively, will suffice.

Next, a clay coagulant was added in the manner of from 10 to 50 p.p.m. The coagulant can be from a variety of coagulants available such as those having the tradenames Polyox which is a polymer of ethylene oxide and K-Pam which is a polyacrylamide. Upon adding the coagulant, the clay began to flocculate and settling occurred in minutes. The solution was heated slightly from 25° C. to 40° C. to aid in the settling process. The flocculated clay along with adsorbed debris was then separated by filtration through a coarse sand bed. Quantitative analysis of the clarified solution showed no loss of polymer and additional tests showed that the viscosity of the clarified solution was the same as that of the original turbid solution.

What is claimed is:
1. A method of clarifying an aqueous solution of microbially-produced polysaccharide B–1459, the heteropolysaccharide produced by bacterium *Xanthomonas campestris* NRRL–1459, which contains bacterial debris comprising:
   (a) adding bentonite clay to said solution;
   (b) adding a monovalent and/or divalent salt to said solution;
   (c) adding a clay coagulant to said solution; and
   (d) separating the flocculated clay and adsorbed debris from the solution.
2. The method of claim 1 wherein:
step (a) is carried out before step (b).
3. The method of claim 1 wherein:
step (b) is carried out before step (a).
4. The method of claim 1 wherein:
said clay coagulant is polyacrylamide.
5. The method of claim 1 wherein:
said bentonite clay is added in the amount of from 0.15% to 0.3% by weight.
6. The method of claim 1 including:
heating the solution after step (c) to aid in flocculating the clay and adsorbed debris thereon prior to carryout step (d).
7. A method of clarifying an aqueous solution of microbially-produced polysaccharide B–1459, the heteropolysaccharide produced by bacterium *Xanthomonas campestris* NRRL–1459, which contains bacterial debris and which containe a monovalent and/or divalent salt, the method comprising:
   (a) adding bentonite clay to said solution;
   (b) adding a clay coagulant to said solution; and
   (c) separating the flucculated clay and adsorbed debris from the solution.
8. The method of claim 7 wherein:
said clay coagulant is polyacrylamide.
9. The method of claim 7 wherein:
said bentonite clay is added in the amount of from 0.15% to 0.3% by weight.
10. The method of claim 7 including:
heating the solution after step (b) to aid in flocculating the clay and adsorbed debris thereon prior to carrying out step (c).

References Cited
UNITED STATES PATENTS

| | | | |
|---|---|---|---|
| 3,251,768 | 5/1966 | Walker | 260—209 R |
| 3,314,801 | 4/1967 | Cadmus | 260—209 R |
| 3,382,229 | 5/1968 | Patton et al. | 260—209 R |
| 3,516,983 | 6/1970 | Colegrove | 260—209 R |

LEWIS GOTTS, Primary Examiner

J. R. BROWN, Assistant Examiner

PO-1050
(5/69)

UNITED STATES PATENT OFFICE
CERTIFICATE OF CORRECTION

Patent No. 3,711,462            Dated January 16, 1973

Inventor(s) Milton K. Abdo

It is certified that error appears in the above-identified patent and that said Letters Patent are hereby corrected as shown below:

Column 1, Assignee: "Mobile" should be --Mobil--;
          line 15, "absorb" should be --adsorb--.

Column 2, line 8, "absorb" should be --adsorb--;
          line 17, "mineral" should be --minimal--.

Column 3, line 24, --with-- should be inserted after "along" and before "the";
          line 49, "dispersed" should be --dispensed--;
          line 51, "marked" should be --marketed--;
          line 61, "manner" should be --amount--.

Column 4, claim 6, line 34, "carry-" should be --carrying--;
          claim 7, line 41, "containe" should be --contains--.

Signed and sealed this 29th day of May 1973.

(SEAL)
Attest:

EDWARD M. FLETCHER, JR.　　　　　　　　ROBERT GOTTSCHALK
Attesting Officer　　　　　　　　　　　　Commissioner of Patents